(12) United States Patent
Giers

(10) Patent No.: US 7,389,390 B2
(45) Date of Patent: Jun. 17, 2008

(54) METHOD, MICROPROCESSOR SYSTEM FOR CRITICAL SAFETY REGULATIONS AND THE USE OF THE SAME

(75) Inventor: Bernhard Giers, Frankfurt (DE)

(73) Assignee: Continental Teves AG & Co. oHG, Frankfurt am Main (DE)

( * ) Notice: Subject to any disclaimer, the term of this patent is extended or adjusted under 35 U.S.C. 154(b) by 508 days.

(21) Appl. No.: 10/477,856

(22) PCT Filed: May 6, 2002

(86) PCT No.: PCT/EP02/04946

§ 371 (c)(1),
(2), (4) Date: Aug. 30, 2004

(87) PCT Pub. No.: WO02/093287

PCT Pub. Date: Nov. 21, 2002

(65) Prior Publication Data

US 2006/0161918 A1 Jul. 20, 2006

(30) Foreign Application Priority Data

May 16, 2001 (DE) ................ 101 24 027

(51) Int. Cl.
*G06F 12/00* (2006.01)
*G06F 13/00* (2006.01)
*G06F 13/28* (2006.01)

(52) U.S. Cl. .................. 711/154; 710/36; 714/819

(58) Field of Classification Search .......... 710/36; 711/154, 819
See application file for complete search history.

(56) References Cited

U.S. PATENT DOCUMENTS 6,823,251 B1* 11/2004 Giers .................... 701/76
2002/0156564 A1* 10/2002 Preston et al. ............ 701/70

FOREIGN PATENT DOCUMENTS

| DE | 3938501 | 5/1991 |
| DE | 19529434 | 2/1997 |
| GB | 2267984 A | * 12/1993 |

* cited by examiner

*Primary Examiner*—Matthew Kim
*Assistant Examiner*—Edward J Dudek

(57) ABSTRACT

In a method of operating a microprocessor system provided with safety functions, which comprises two or more processor cores (1, 2) and periphery elements (5, 7) on a common chip carrier, to which the cores can have access for write or read operations, a distinction is made between algorithms for safety-critical functions and algorithms for comfort functions.

Further, a microprocessor system appropriate for implementing the method, and the use of the same, has process cores connected to periphery elements (5,6,7,8,9,10) by way of bus systems (3, 4), and bus driver circuits (19) can transmit bus information from one bus to another with the provision of at least one address comparator (18).

11 Claims, 1 Drawing Sheet

US 7,389,390 B2

METHOD, MICROPROCESSOR SYSTEM FOR CRITICAL SAFETY REGULATIONS AND THE USE OF THE SAME

BACKGROUND OF THE INVENTION

The present invention relates to a method of operating a microprocessor system provided with safety functions, which comprises two or more processor cores on a joint chip carrier, a microprocessor system for at least partly safety-critical regulations, comprising at least two processor cores which are connected to periphery elements (5,6,7,8,9,10) by way of at least two bus systems associated with the cores, and at least two bus driver circuits able to transmit bus information from one bus to the other bus, and a motor vehicle control/regulation system comrising such a microprocessor system.

EP 0 843 853 A1 discloses a microprocessor system for safety-critical control systems comprising two synchronously operated central units or CPU cores which can have access to periphery elements integrated on the same chip such as memory and input/output components by way of two separate bus systems. The microprocessor system described is especially used for safety-critical control and regulation systems in vehicles, for example, for the active control, or a control activated by the brake function, of the brake pressure applied to the wheels, such as in yaw rate control systems (ESP, TCS), lock control or anti-lock systems (ABS) and traction slip control systems (TCS, etc.). By doubling the processor core, the bus system and at least partly also the periphery elements it is possible to monitor processing errors in one of the two processors either by the respectively second processor or by a device checking whether the result of a working step is identical in both processors. This method permits a drastic increase of the error detection rate because errors that occur simultaneously in both processor branches are comparatively unlikely. Once an error is detected, appropriate measures can be taken such as deactivation of the control system or implementation of an emergency program (trap/interrupt) or a reset, thereby enhancing the reliability of operation of a brake system.

The periphery elements, which are connected to the two bus systems, generally comprise permanent stores (ROM, OTP, Flash) and read-write memories (RAM), and input and output units or further bus systems connected by way of bus driver circuits. The bus systems are connected or coupled to each other by drive stages so that the processor cores can also write data into the respectively other bus system, or read the data. The design of the microprocessor system described in EP 0 843 853 A1 is not fully redundant with respect to the memory. At least part of the memory, which is connected to one of the two buses, is reproduced virtually by a hardware comparator. The reproduced memory in this case does not contain the same data word as the first memory at the same address but parity information linked to the complete data word that was calculated or produced from the data word written in the storage. The advantage involved hereby is that a major part of the memory existing for redundancy reasons can be saved practically without any loss of safety.

An object of the present invention is to further improve upon the above-mentioned microprocessor system in that way that a distinction can be made between data and/or programs being uncritical with respect to safety and critical data and/or programs.

Another objective of the invention is to provide a microprocessor system, which now as before reaches a high rate of error detection as in prior-art systems with respect to the critical data and/or programs so that the reliability of operation mandatory for safety-critical applications is complied with, and which additionally offers the opportunity of executing programs which do not meet the high safety requirements of the safety-critical programs without disturbing the run of the safety-critical programs by any additional programs. In addition, it is desired that the microprocessor system involve comparatively low effort in manufacture.

SUMMARY OF THE INVENTION

This object is achieved by a method including the step of making a distinction between algorithms for safety-critical functions and algorithms for comfort functions and a microprocessor system that comprises at least one address comparator (18) comparing the addresses of at least one processor core with at least one established address range.

The microprocessor system comprises two or more microcomputers. At least one of these microcomputers is a complete unit made up of central unit and periphery elements comprised of read-only memory, read-write memory and input/output unit. The term 'complete unit' implies that the microcomputer includes the components necessary for its basic functions, which does not exclude that part of the periphery such as additional memory components is arranged outside the chip or the chip casing. These externally arranged chips can then be actuated by way of further external bus systems or by way of local buses extending to the outside.

The periphery elements, the processor cores and the bus systems of the existing at least two microcomputers are integrated on a joint chip carrier which is preferably a semiconductor dice. As mentioned before, it is possible and hence preferred that the chip carrier on which the processor cores are integrated, comprises integrated periphery elements.

It can be expedient that the microcomputer connected to a second bus system does not coincide exactly with the first microcomputer in defined address ranges, e.g. in that defined memory components are not provided in a microcomputer. Also, a memory with memory locations for test data may be provided in one of the two microcomputers instead of a read-only and/or read-write memory. Among others, the two bus systems are interconnected by way of coupling drive stages for the exchange of data in the above-noted address ranges. A high degree of redundancy may be achieved by the mainly complete double or manifold design of the periphery, in particular the memory.

Especially preferred is, however, a microprocessor system wherein the memory, in particular the read-write memory and the read-only memory, has a fully redundant design at least in defined address ranges.

Further preferred embodiments can be taken from the sub claims and the following description of the Figures.

DETAILED DESCRIPTION OF THE DRAWING

Figure 1:
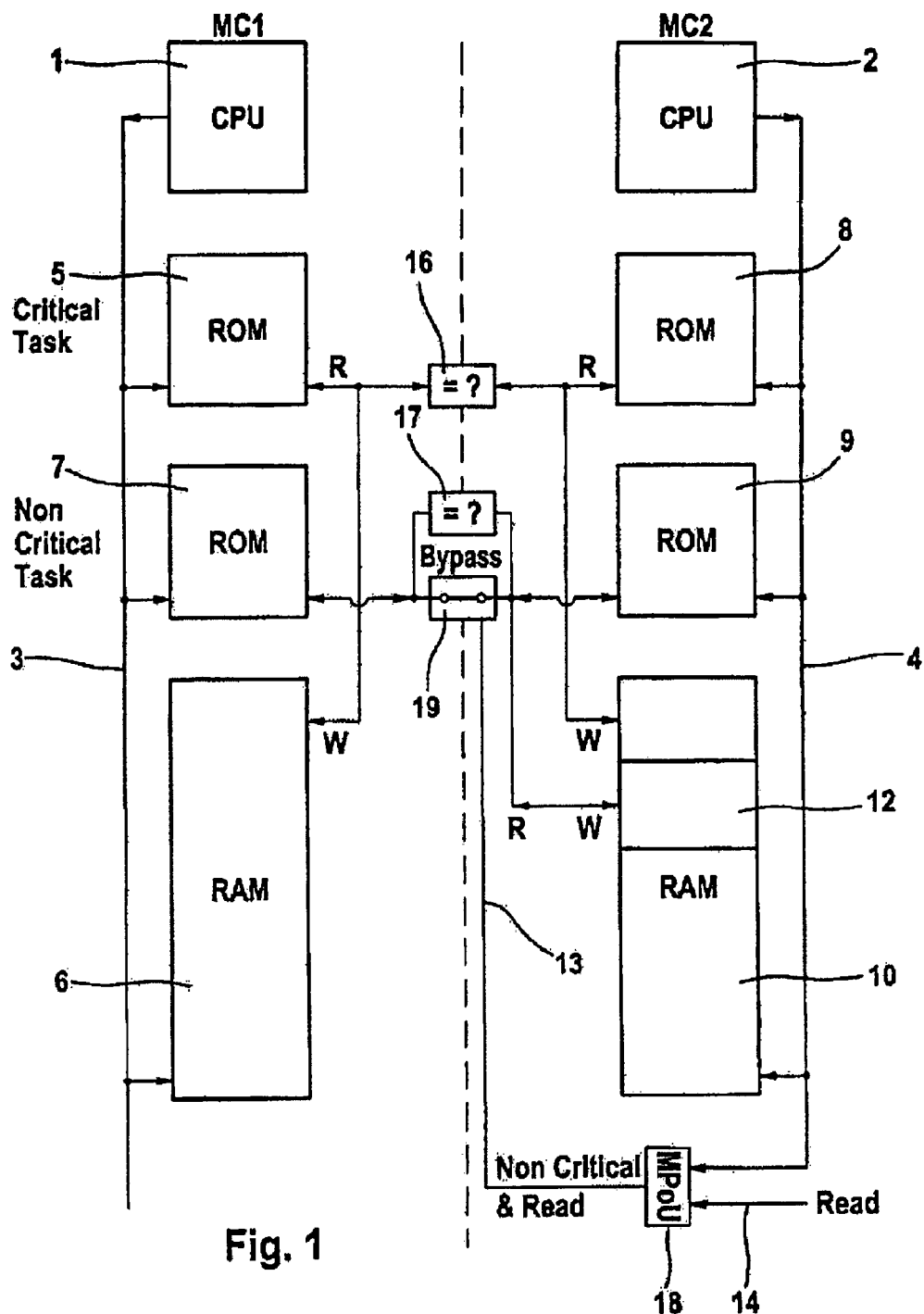
FIG. 1 is a schematic view of a microprocessor system of the invention.

The embodiment of FIG. 1 illustrates a one-chip microcomputer system comprising two synchronously operated central units 1, 2, also referred to as computer or processor cores or as CPUs, and separate bus systems. The central unit 1 is supplemented to become a complete microcomputer MC1 by one common or several read-only memories 5, 7 (ROM), a read-write memory 6 (RAM) and by input and output stages not plotted (e.g. for periphery or external other bus systems). Connected to the second bus system 4 of the central unit 2 are two other read-only memories 8, 9 and read-write memories 10 which exactly correspond to the memories of the first microcomputer MC1 either only logically or also physically (full redundancy). The elements on bus 4 will then form the second microcomputer MC2.

Each of the bus systems linking the computer cores to the memory and the input/output ranges preferably comprises a control bus, a data bus, and an address bus. For reasons of clarity, only the address bus 3 for core 1 and address bus 4 for core 2 are plotted in FIG. 1. As is known, data is transmitted from the memories to the microprocessor (read) and subsequently from said back into the memory (write), with the instantaneously active memory address being applied to the address bus. For checking the address sent to the address bus 4, bus 4 is led to an address-monitoring device 18 that preferably has a redundant design. When the address being controlled is within an allowable address range, a signal is output by way of the connection 13. The output of the signal by way of connection 13 can be made contingent on whether a write operation prevails (line 14).

Write or read errors are detected by means of comparators 16 and 17 which allow a comparison of data on the two bus systems of MC1 and MC2.

Line 13 leads to a bridging device 19, especially driver, which allows the use of non-redundant memory data in determined address ranges, e.g. for the comfort algorithms.

In contrast to state-of-the art systems, no distinction between an active and a passive computer is possible in the microprocessor system of the invention. The two computer cores or central units 1, 2 are equal rather. According to the invention, a distinction is made between safety-critical data or algorithms and comfort data or comfort algorithms. Preferably, the computer cores receive the same input information when processing the safety algorithms and execute the same algorithm (program, subprogram, task). They process especially fully redundantly the jointly read data. During reading or writing data that is to be allocated to a safety algorithm, the input and output signals of the computers 1, 2 are preferably checked for coincidence by the comparing elements in the comparators 16 and 17 described hereinbelow, and the signals to be compared are applied to the data bus of the respective computer.

Preferably, a separate data bus is associated with each computer core. The data lying on the buses are bit-wise compared by means of comparators 16 and 17 that are in particular realized by simple logical components. In the absence of identity of data, it is possible to initiate system deactivation or generate a suitable signal for error treatment.

The comparators 16 and 17 particularly are binary comparators preferably having a redundant design exactly as the bridging device. Upon non-concurrence of the values, especially data, applied to the bus, or in the event of errors, said comparators will preferably generate disconnecting signals or other appropriate signals for error treatment.

The bridging device 19 is used to transmit bus information from one bus to the other bus.

In systems with several processor cores, the device 19 allows the second core having access to data, which does not lie within the possible address range that is associated with the second core.

The output signals of both central units are equally entitled at least in the execution of the safety algorithms, that means actuation of the periphery elements can also be effected by only one of the two central units.

Not illustrated in FIG. 1 are the input/output devices of the periphery elements to which e.g. the wheel sensors of a motor vehicle control system are connected, with the output signals of the wheel sensors being the most important input quantities of the control system. In this arrangement, it is preferred to share the sensor signal supply between the two bus systems 3, 4. Signal supply may, however, also be designed redundantly, i.e., by conducting the sensor signals to both bus systems 3, 4.

In a first preferred embodiment, the memory of the microprocessor system of the invention, in particular the read-write memory, has a fully redundant design, that means for each data word of the memory of the first processor 2, there is an associated data word of equal length of the second processor 2.

In a second preferred embodiment of the microprocessor arrangement, test bits or parity bits are produced for error detection when reading and writing the data stored and becoming stored, said bits being stored in a second memory. This error detection method is described in EP 0 843 853 A1.

However, it is also possible that some or all data words in the second memory are parity information memorized instead of the full data word.

According to this method, the redundancy information is stored e.g. with respect to each memory location of the read-only and/or read-write memory of a first computer MC1 under the same address in a parity memory of the second computer MC2 that comprises only memory locations for the test data. It may be arranged for that the test or redundancy information for the read-only memory is determined already during programming. In the read-write memories this test or redundancy information is generated during the write operation, especially by means of logical components. Analogously to the read operation of the data and commands, the test or redundancy information is transmitted by way of the drive stage 16 or 17 that links the two bus systems 3, 4. Consequently, the data to be written is extended by redundant information stored with the data in a write operation. In a read operation, said data and the read-back redundant information will then be checked for validity by comparators provided in the bus driver circuits.

To detect errors in the transmission of information by way of the bus system, a redundant design is realized in the form of bus systems 3 and 4. Comparators monitor the signals output by two processor cores 1, 2 and prevailing on the bus systems for concurrence.

In a preferred fashion, the comparators may be realized by means of logical elements, e.g. in a known fashion by means of exclusive OR-gates.

The address comparator 18, which preferably has a redundant design, compares the addresses of an address bus with one or more predetermined valid or invalid address ranges. Favorably, said comparator is composed of two binary comparators monitoring the access to elements within the address bus 4 and finding out whether the access is made to a defined memory range or lies outside this range.

The above-described microprocessor system renders it possible to distinguish between critical, safety-relevant algorithms and comfort algorithms, which are used to execute functions not critical under safety aspects. When, for example, the microprocessor system is employed in a control unit of an electrohydraulic brake system (EHB) or electromechanical brake system (EMB), one would assess an algorithm that is required in connection with a normal braking operation as critical under safety aspects. Other algorithms, which are e.g. used to limit the speed of the vehicle (speed limiter) or to determine the tire pressure from the ABS wheel speed data, can be considered as comfort algorithms, however, because malfunction in an algorithm of the last-mentioned type would not jeopardize vehicle passengers or other traffic participants.

In addition, it is advantageous in the invention that errors caused in the execution of comfort algorithms will not interrupt, adversely influence or even terminate the course of algorithms for critical functions.

The coupling of the driver 19 to the address comparator 18 of the invention, in particular by way of a logical line 13, permits identifying e.g. erroneous access of write operations to the periphery, especially the read-write memory, triggered by a comfort algorithm, and restoring the original data.

Preferably, write access to the read-write memory, which is a result of just processed comfort algorithms (see program range 7), is always written into only one of the two memories provided for redundancy reasons, for example, into the RAM range 12.

To this end, the bridging element 19 is so operated that reading access is always provided by way of element 19 from one of the two memories 6 and 10 into both bus systems 3 and 4 for the address ranges associated with the comfort algorithm. Therefore, provision of a monitoring device is preferred which, depending on whether there is read or write operations, the bridging element 19 switches over in a suitable manner. Write operation can this way be executed by only one microprocessor. It is further possible to previously check the data being written for coincidence.

It may, of course, be desirable that both comfort algorithms and safety algorithms can have access to joint address ranges. This is suitable either in the event of jointly used input/output units, in jointly required sub-programs (e.g. library routine), or for the purpose of data exchange. To this end, the address ranges determined in the address comparator may overlap each other at least in part.

In another preferred embodiment, a write operation outside the admissible address range(s) predetermined by the unit 18 is carried out only in one of the two memories 6 or 10 (non-redundant writing). The optionally overwritten value can always be reconstructed this way. This is possible because the invention reliably prevents the data value from being overwritten in the second memory, which is provided for safety reasons, by defining beforehand which physical memory range of the read-write memory is defined as a protected range.

Values, which establish the predetermined address ranges, may either be invariably predefined or defined as variable in the address comparator 18, in the latter case e.g. by means of a re-writable memory (e.g. flipflop) accommodated in unit 18. It is especially suitable when the address ranges predetermined by the address comparator 18 are predefined invariably rather than variably, especially by an arrangement executing a hard-wired decoding of address bus 4.

The invention claimed is:

1. A method of operating a microprocessor system provided with safety functions, which comprises two or more processor cores (1, 2) on a joint chip carrier, the microprocessor system comprising periphery elements (5, 7) to which the cores can have access for write or read operations, including the steps of
    making a distinction between algorithms for safety-critical functions and algorithms for comfort functions,
    storing safety-critical data in critical-data ranges,
    storing comfort-related data in uncritical-data ranges (12),
    generating, by means of the safety-critical functions, input/output operations for a first type of devices intended for safety functions, and
    generating, by means of the comfort functions, input/output operations for a second type of devices intended for comfort functions
    wherein exclusively critical algorithms are stored in two or more first separate chip ranges or components (20) of two or more read-only memories (5 and 8) or corresponding partial ranges of respectively contiguous joint read-only memories (5, 7 and 8, 9), and exclusively comfort algorithms are stored in two or more other separate chip ranges or components (21) of the read-only memory (7 and 9) or in corresponding other partial ranges of respectively contiguous joint read-only memories (5, 7 and 8, 9).

2. The method as claimed in claim 1, wherein access to address ranges of the periphery elements allocated to the safety algorithms is possible only when a safety algorithm controls the system program run, and access to ranges of the periphery elements allocated to the comfort algorithms are allowed only when comfort algorithms control the system program run.

3. The method as claimed in claim 1, wherein the periphery elements comprise read-only memories (5, 7, 8, 9) in which algorithms for functions that mainly serve comfort, are stored in addition to algorithms for safety-critical functions.

4. The method as claimed in claim 1, wherein upon occurrence of an erroneous write access of a comfort algorithm, an erroneous memory access is identified and the incorrect data value corrected.

5. The method as claimed in claim 1, wherein a comparison of data lying on data buses (3, 4) is not made in a read operation in at least one predetermined address range.

6. A microprocessor system for at least partly safety-critical regulations, comprising at least two processor cores (1, 2) which are connected to periphery elements (5,6,7,8, 9,10) by way of at least two bus systems (3,4) associated with the cores, and at least two bus driver circuits (19) able to transmit bus information from one bus to the other bus,
    wherein the microprocessor comprises at least one address comparator (18) comparing the addresses of at least one processor core with at least one established address range, and
    wherein a bridging device (19) is provided that can be actuated by the address comparator (18) by way of a connection (13), said bridging device deactivating or bridging one or more data comparators (16, 17) in dependence on the result of the comparison of addresses.

7. The microprocessor system as claimed in claim 6, wherein the microprocessor comprises at least one data comparator (16, 17) which detects a writing error in the periphery elements by comparing data of the first bus with data of another bus.

8. The microprocessor system as claimed in claim 6, wherein the bus systems have substantially the same design.

9. The microprocessor system as claimed in claim 6, wherein the periphery elements comprise at least read-write memories (10), read-only memories (5,7,8,9) and input/output elements (10).

10. The microprocessor system as claimed in claim 6, wherein the comparator of addresses comprises logical components, in particular binary comparators.

11. The microprocessor system as claimed in claim 6, wherein at least one element of the group consisting of address comparator (18), comparator (16, 17) and driver (19) is designed redundantly.

* * * * *